United States Patent [19]

Matsuda et al.

[11] Patent Number: 5,020,881

[45] Date of Patent: Jun. 4, 1991

[54] LIGHT MODULATING DEVICE WITH OPTICAL SWITCHING UNIT OF LAMINATED INSULATING AND CONDUCTIVE LAYERS

[75] Inventors: Hiroshi Matsuda, Isehara; Haruki Kawada, Yokohama; Kunihiro Sakai, Isehara; Kiyoshi Takimoto, Kawasaki; Hisaaki Kawade; Yoshihiro Yanagisawa, both of Atsugi; Yuko Morikawa, Yokohama, all of Japan

[73] Assignee: Canon Kabushiki Kaisha, Tokyo, Japan

[21] Appl. No.: 301,476

[22] Filed: Jan. 26, 1989

[30] Foreign Application Priority Data

Jan. 26, 1988 [JP] Japan .................................. 63-13499

[51] Int. Cl.[5] .............................................. G02F 1/133
[52] U.S. Cl. ..................................... 350/333; 350/334; 350/339 R; 350/336
[58] Field of Search ..................... 350/333, 334, 339 R, 350/345, 336

[56] References Cited

U.S. PATENT DOCUMENTS

| 3,824,002 | 7/1974 | Beard | 350/342 |
| 3,944,332 | 3/1976 | Tutihasi et al. | 350/342 |
| 4,538,884 | 9/1985 | Masaki | 350/342 |
| 4,619,501 | 10/1986 | Armitage | 350/342 |
| 4,666,252 | 5/1987 | Yaniv et al. | 350/333 |
| 4,715,685 | 12/1987 | Yaniv et al. | 350/333 |
| 4,768,863 | 9/1988 | Fertig et al. | 350/339 R |
| 4,917,474 | 4/1990 | Tamazaki et al. | 350/333 |

FOREIGN PATENT DOCUMENTS 8700643 1/1987 PCT Int'l Appl. .

OTHER PUBLICATIONS

Patent Abstracts of Japan, vol. 6, No. 255 (P-162) [1133], Dec. 14, 1982.

Primary Examiner—Stanley D. Miller
Assistant Examiner—Anita Pellman Gross
Attorney, Agent, or Firm—Fitzpatrick, Cella, Harper & Scinto

[57] ABSTRACT

A light modulating device having a signal input unit for generating an optical signal, an optical switching unit using an alternately-laminated structure consisting of insulating layers sandwiching a conductive or semiconductive layer, and a display medium responsive to electric field. The device controls the electric field strength applied to the display medium by irradiating or interrupting light on the optical switching unit in accordance with an input signal, and performs a display corresponding to the input signal.

64 Claims, 5 Drawing Sheets

LIGHT MODULATING DEVICE WITH OPTICAL SWITCHING UNIT OF LAMINATED INSULATING AND CONDUCTIVE LAYERS

BACKGROUND OF THE INVENTION

1. Field of the Invention

This invention relates to a light modulating device for use as a display panel, and more particularly, to a light modulating device which is suitable for a liquid crystal display medium.

2. Description of the Prior Art

In general, driving methods for display devices using liquid crystal material, electroluminescence (termed hereinafter "EL") and the like, can be classified into the static driving method and the multiplex driving method, according to the method of supplying signals.

In the static driving method, signals for display or erasing are applied independently to each display segment (picture element) electrodes. Accordingly, as the amount of display information (i.e., the number of display segments) is increased, the number of components, such as electrode terminals, connectors, interconnections, driving circuits or the like, is also proportionately increased. This increases the size and the cost of the entire display device. Hence, this driving method is limited to smaller applications such as clocks, bar graph displays, oscilloscope displays and the like.

On the contrary, the multiplex driving method is a method for increasing display capacity using fewer driving circuit elements by performing matrix display. In this method, all picture elements are divided into plural groups. Display frame time is also divided, and a display signal is applied to each group of picture elements in phase with the divided timing. Hence, this driving method is also called the time sharing driving method. Several techniques are considered in the method for dividing data signal and in the applied wave form. In the liquid crystal display device, for example, there have been devised the voltage averaging method, memory-effect-type driving method, double-channel driving method and the like. In the EL display device, there have been devised the field-refreshing driving method, p-n symmetrical driving method, push-pull symmetrical driving method and the like. In these techniques, however, when the number of picture elements is increased, the divided number of frame time also proportionately increases. Hence, the duty ratio (that is, the ratio of time allocated to each one of scanning lines to the frame time during the scanning of display signals) becomes small, and thus, the driving margin (the ratio of the effective-value voltage applied to the selected (lighting) picture element for display to that applied to the nonselected (nonlighting) picture element) is also decreased. Thus, driving becomes difficult.

Now, as a method for solving such problems, the active matrix driving method is attracting attention. This driving method is not characterized in its driving wave form, but in providing a switching device for each picture element. As a result, the duty ratio is 100%, and the driving margin can also be increased. However, although the active matrix driving method very effectively displays a large quantity of display information at a high quality, the driving method has a disadvantage in that it is necessary to provide a switching device for each intersection point (picture element) and thus its configuration becomes very complicated. As such switching devices, it has been considered to use the MIM (Metal-Insulator-Metal) devices, varistors, two-terminal ferroelectric devices, ring diodes and the like, and three-terminal devices made of CdSe, Te, a-Si, p-Si and the like. However, irrespective of the switching device which is used, it is impossible to avoid either the device configuration from being complicated or the difficult production process arising therefrom.

SUMMARY OF THE INVENTION

It is an object of the present invention to provide a light modulating device which enables a high-density and high-quality display without complicated configuration.

In the following description and drawings, a technique is disclosed which enables a light modulating device with a high-density and high-quality display without complicated configuration, by combining an optical switching unit using an alternately-laminated structure made of ultra-thin organic films with a display medium responsive to electric field, such as liquid crystal and the like.

A light modulating device according to the present invention comprises a signal input unit for generating an optical signal, an optical switching unit using an alternately-laminated structure consisting of insulating layers and a conductive or semiconductive layer and a display medium responsive to electric field, and controls the electric field strength applied to the display medium by illuminating or interrupting light on the optical switching unit in accordance with an input signal and provides a display corresponding to the input signal.

DETAILED DESCRIPTION OF THE PREFERRED EMBODIMENTS

In the present invention, a well-known light source signal input unit and a liquid crystal display medium which is responsive to electric field and the like may be used. The present invention also features an optical switching device which comprises an alternately-laminated structure using ultra-thin films of organic materials and is responsive to light. The switching device is unrivaled compared with conventional devices relative to the current-voltage characterstics and thus a field-driven-type display medium is directly driven, utilizing such novel responsive property to light. In the light modulating device of the present invention, as described below, it is possible to directly drive a display medium for each picture element. Hence, the driving margin can be made sufficiently large and a high-density, high-resolution display is possible.

The basic configuration of an optical switching device used in the present invention will be hereinafter explained.

Figure 1:
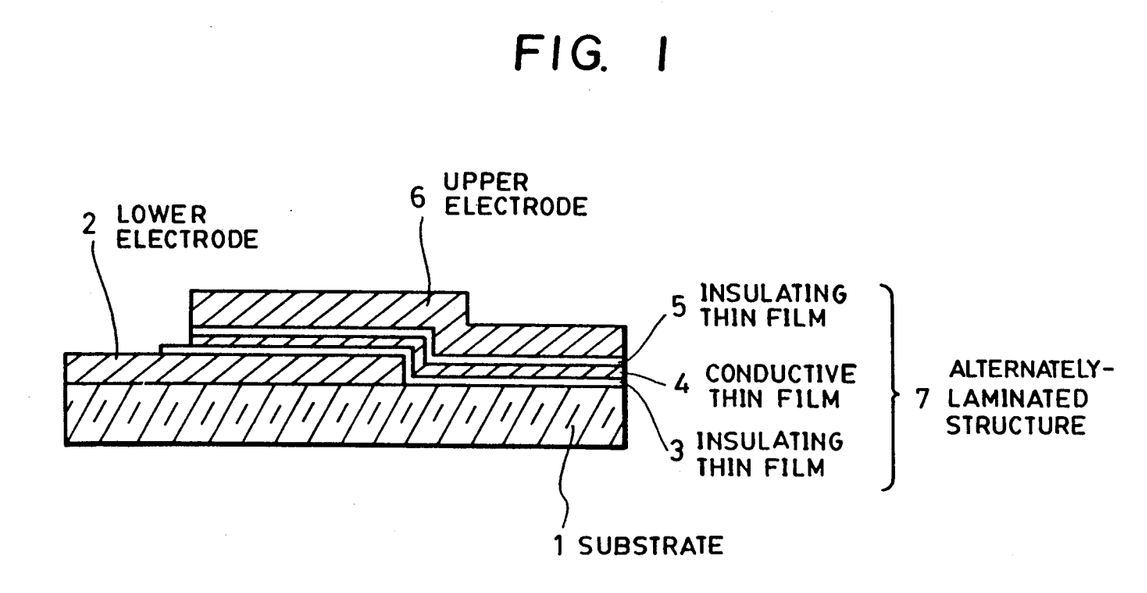
FIG. 1 is a schematic diagram of an optical switching device.

FIG. 1 is a schematic diagram of an optical switching device used in the present invention. In FIG. 1, between a lower electrode 2 formed on a substrate 1 and an upper electrode 6, an alternately-laminated structure 7 consisting of an insulating thin film 3, a conductive thin film (or a semiconductive thin film, the term being utilized hereafter) 4 and an insulating thin film 5 is disposed. As materials for the electrodes used here, many conventional materials can be enumerated, including Au, Ag, Al, Pt, Ni, Pb, Zn, Sn and the like, alloys of these metals and laminated structures of these metals or alloys, semiconductors such as Si (single-crystal silicon, polysilicon, amorphous silicon), graphite, silicides (nickel silicide, palladium silicide), GaAs, GaP, ITO, NESA or the like, or laminated structures of these semiconductors. The electrodes 2 and 6 may be of the same or different materials.

As for the method for forming such electrodes, conventional well-known techniques for forming thin films may sufficiently achieve the object of the present invention. However, when the insulating regions of the present device are made of organic materials, the electrode formed after the organic insulating layer is formed is preferably made by a film-forming method under the condition of no higher than 300° C. For example, the electrodes may be formed by vacuum deposition or sputtering.

Although radiation (such as visible light) is irradiated as the input signal when the present invention is used, the electrodes need not be completely transparent to the radiation. For example, metal electrodes, such as Au, Al and the like, can even be used, under the condition that the film thickness is sufficiently small. In this regard, film thickness in such cases is preferably no larger than 1000 Å, more preferably no larger than 500 Å.

An alternately-laminated structure consisting of a conductive thin film 4 and insulating thin films 3 and 5 are formed between electrodes 2 and 6. For forming insulating thin films 3 and 5, vacuum deposition, molecular-beam epitaxy techniques and the like can be utilized. Further, oxide films such as SiO$_2$, Al$_2$O$_3$ and the like, or nitride films such as Si$_3$N$_4$ and the like, can also be utilized, depending on the configuration of the device. In any case, the insulating film must be an ultra-thin film, i.e., the film thickness is preferably no larger than 500 Å, more preferably no larger than 200 Å, further more preferably no larger than 100 Å and no smaller than 4 Å.

As the most preferred film-forming method for forming the insulating thin films 3 and 5 in a preferred concrete example of the present invention, the Langmuir-Blodgette ("LB") method can be proposed.

By the LB method, a monomolecular film of an organic compound which has a hydrophobic portion and a hydrophilic portion within one molecule, or an accumulated film thereof can be easily formed on an arbitrary electrode or an arbitrary substrate including an arbitrary electrode. Thus, it is possible to stably supply an organic ultra-thin film having a thickness on the order of molecular-length which is nevertheless uniform and homogeneous over a large area.

The LB method is a method for forming a monomolecular film or an accumulated film thereof utilizing the phenomenon that molecules with a structure having hydrophilic and hydrophobic portions form a monomolecular layer on the surface of water wherein the hydrophilic group is directed downward, when the balance between the both portions (the balance of the amphiphilic property) is properly maintained.

As groups for forming a hydrophobic portion, there are several kinds of widely known hydrophobic groups such as saturated and unsaturated hydrocarbon, condensed polycyclic aromatic, chain polycyclic phenyl groups and the like. Each of these groups forms a hydrophobic portion by itself or by the combination of plural groups. On the other hand, as the most typical constituents for the hydrophilic portion, there are known the carboxyl, ester, acid amide, imide, hydroxyl, sulfonyl, phosphoric acid, amino (primary, secondary, tertiary and quaternary) groups and the like.

Any molecules which have both hydrophobic and hydrophilic groups in good ballance can form a monomolecular film on the surface of water. Since, in general, these molecules form an insulating monomolecular film and is an accumulated film of monomolecular layers is insulative, it can be said that these molecules are extremely suitable materials for the present invention. As examples, the following molecules can be enumerated.

(1) MOLECULES WHICH HAVE THE $\pi$-ELECTRON LEVELS

Dyes having the polyphylline framework, such as phthalocyanine, tetraphenylpolyphilline and the like, azulene-system dyes having the squarylium group and chlochonic methine group as bond chains, two nitrogen-containing heterocycles, such as quinoline, benzothiazole, benzoxazole and the like, dyes similar to the cyanine-system, or cyanine dyes, bonded by the squarylium group and chlochonic methine group, the condensed polycyclic aromatic group, such as anthracene, pyrene and the like, chain compounds in which aromatic or heterocyclic compounds are condensed and the like.

(2) MACROMOLECULAR COMPOUNDS

Polyimide derivatives, polyamic-acid derivatives, fumaric-acid copolymers of polyamide derivatives, fumaric-acid copolymers of maleic amide derivatives, maleic-acid copolymers, polyacrylic-acid derivatives, acrylic-acid derivatives, polymethacrylic-acid derivatives, methacrylic-acid copolymers, polydiacetylene derivatives, vinyl compounds, synthetic polypeptides, biomacromolecular compounds, such as bacteriorhodopsin or cytochrome C, and the like.

(3) FATTY-ACIDS

Carboxylic acid and carboxylic acid salts having long-chain alkyl group, their fluorine-substituted compounds, esters having at least one long-chain alkyl group, sulfonic acid and its salts, phosphoric acids and salts and fluorine-substituted compounds and the like.

Of course, any materials which are suitable for the LB method other than those described above can also be properly used in the present invention. However, especially from the viewpoint of heat resistance, it is desirable to use macromolecular compounds, or macrocyclic compounds such as phthalocyanine and the like. In particular, when macromolecular materials of the polyimide family, polyacrylic-acid family, polymethacrylic-acid family, or various kinds of fumaric-acid copolymers, maleic-acid copolymers and the like are used, excellent heat resistance can be obtained while, at the same time, a film thickness per layer of about 4–10 Å can be attained.

As the conductive thin film 4, metals such as Al, Ag, Zn, Sn, Pb and the like, alloys of these metals and semiconductive materials, such as $As_2Se_3$, CdS, ZnO, GaAs, Si (single-crystal silicon, polysilicon, amorphous silicon) can be used. In the present invention, it is required that the film thickness of such conductive thin film 4 is no larger than 500 Å, preferably no larger than 100 Å, more preferably no larger than 50 Å. Especially when a metal or an alloy of metals is used, the film thickness is preferably no larger than 50 Å.

As the method for forming the conductive thin film 4, it is possible to use well-known, conventional film-forming techniques such as the vacuum deposition, cluster ion beam, CVD, plasma polymerization, MBE or sputtering methods.

Insulating thin film 5 is then formed on conductive thin film 4. The constituent material of film 4 may be the same as or different from that of insulating thin film 3 on the lower electrode 2 and can be formed by the various methods already described. The optical switching device of the present invention is produced by further forming the upper electrode 6 on insulating region 5 by one of the methods described above. As the substrate 1 for supporting the laminated thin films, any material, such as metal, glass, ceramics, plastics and the like may be used, and biomaterials having noticeably inferior heat resistance may also be used. Although it is generally preferable that substrate 1 is flat, it is not limited thereto and other configurations may be desired depending upon application.

The switching characteristics of an optical switching device having the configuration described above will now be explained through a concrete example.

Figure 2A:
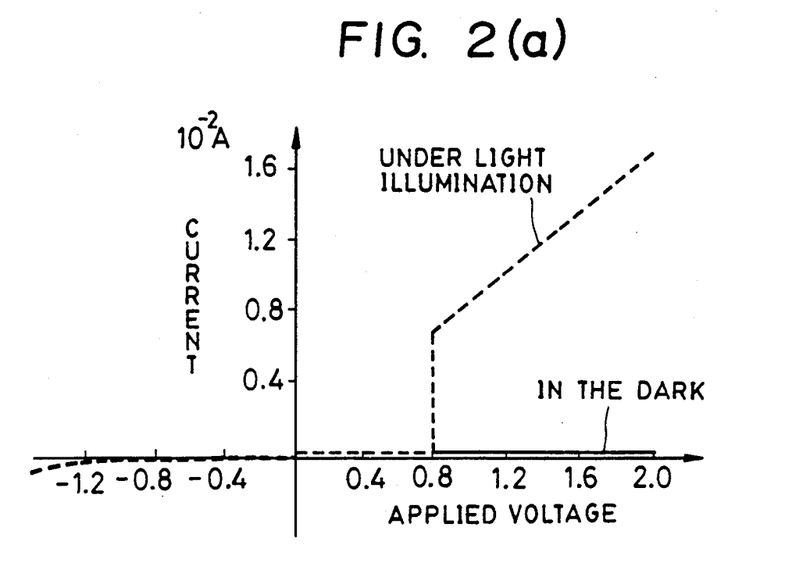
FIG. 2 shows voltage-current characterstics of an optical switching device.
Figure 2B:
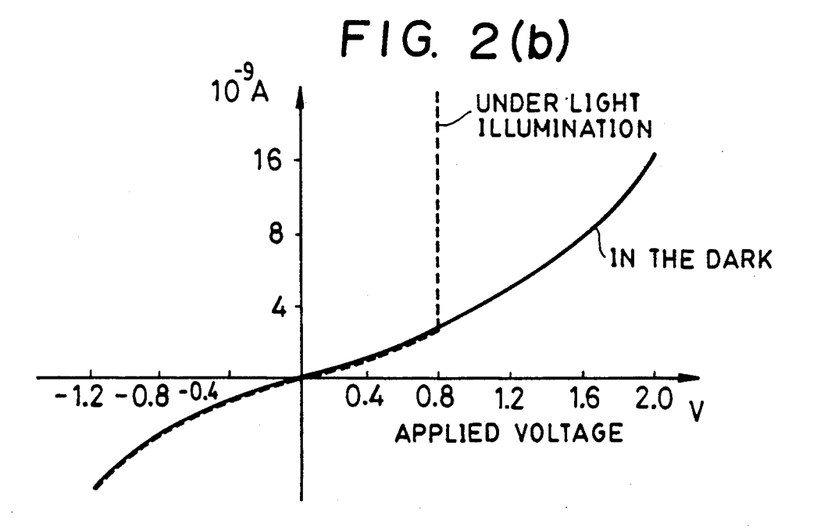

An optical switching device was produced using a vacuum-deposited film of Au on Cr (respectively 300 Å and 600 Å thick) as the lower electrode 2 on the substrate 1 made of glass, an accumulated ten layer LB film of polyimide (40 Å thick) as insulating thin film 3, an Al vacuum-deposited film as conductive thin film 4, an $Al_2O_3$ film (20 Å thick together with the Al vacuum-deposited film) as insulating thin film 5 and vacuum-deposited films of Al and Au (300 Å and 600 Å thick, respectively) as upper electrode 6. The characteristics of current (ordinate) when voltage (abscissa) is applied between the upper and lower electrodes (V-I characteristics) of the optical switching device are shown in FIGS. 2 (a) and 2 (b). In FIG. 2 (a), since the device is in high-resistance state (resistance $\sim 10^8$ Ω) up to the applied voltage of 2 V, very few current flows. On the other hand, under light illumination (white light $\sim 70$ μw/0.55 $cm^2$), the device is in high-resistance state up to the threshold voltage $V_{th}=0.8$ V of the optical switching device, but is converted into a low-resistance state (resistance $\sim 10$ Ω) by applying a voltage exceeding the threshold value. In FIG. 2 (b), the variation of current near the above-described threshold value is enlarged with making the range of current smaller ($\sim 10^{-9}$ Å). The switching speed into such low-resistance state is less than 1 μsec. The device promptly returns into the high-resistance state by interrupting the light illumination. The switching speed at this moment is also less than 1 μsec. That is, by performing light illumination - nonillumination on such optical switching device while applying a voltage of at least the threshold value, it is possible to switch an electric circuit which has the optical switching device as a series component. Consequently, if the optical switching device is incorporated in the driving circuit of a display medium having the responsive property to electric field, such as liquid crystal, EL or the like, it is possible to easily constitute a display device which uses light as input signal.

The basic configuration when the present invention is applied to a liquid crystal display device will be hereinafter explained with reference to the drawings.

Figure 3:
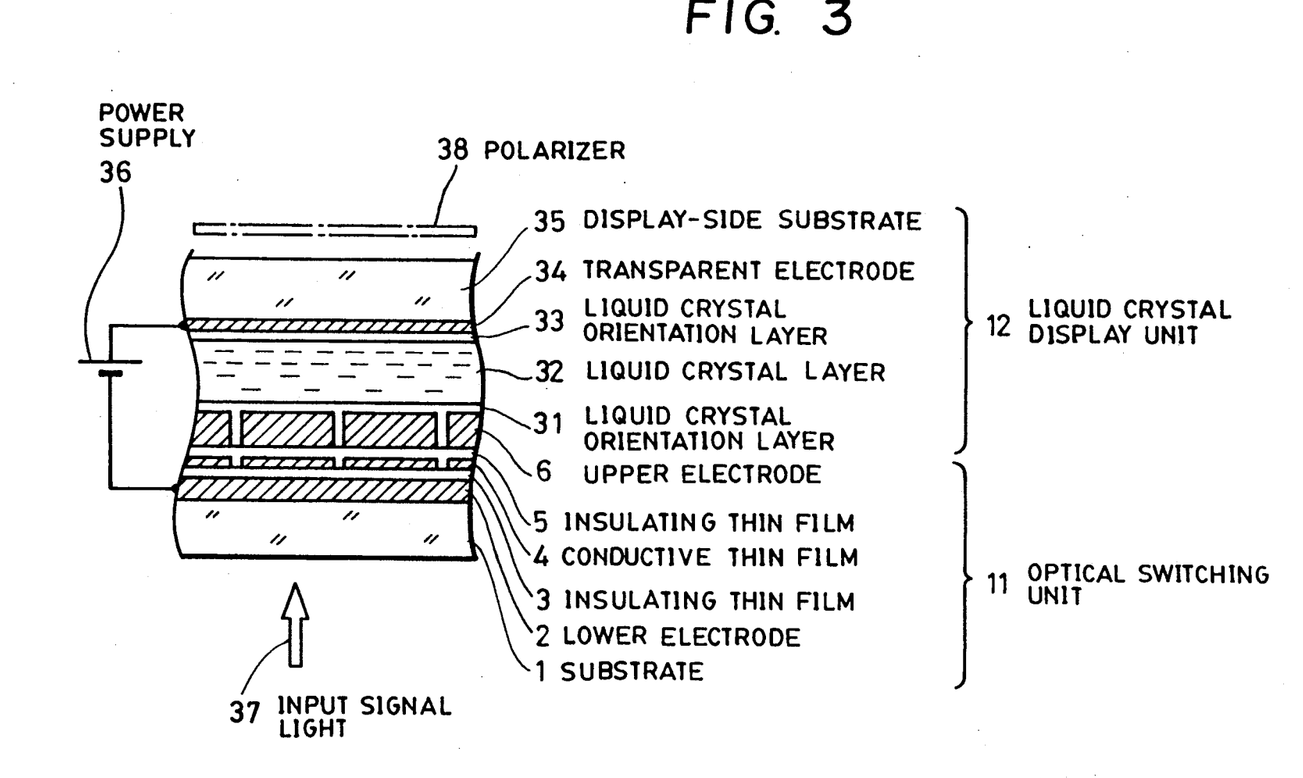
FIG. 3 is a configurational diagram of a display device using a liquid crystal.

FIG. 3 is a configurational diagram of a display device using a liquid crystal as the display medium. In FIG. 3, on the optical switching unit 11 comprising a substrate 1, a lower electrode 2, an insulating thin film 3, a conductive thin film 4, an insulating thin film 5 and an upper electrode 6, a liquid crystal display unit (liquid crystal cell) 12 comprising a liquid crystal orientation layer 31, a liquid crystal layer 32, a liquid crystal orientation layer 33, a transparent electrode 34 and a display-side electrode 35 is directly disposed. A pair of electrodes is necessary for driving the liquid crystal. In the present embodiment, the upper electrode 6 of the optical switching unit 11 is used as one of such pair of electrodes, although an electrode having a different shape and made of another material may also be formed on the upper electrode 6 by vacuum deposition and the like. In either case, the upper electrode 6 of the optical switching unit 11 and one of the pair of electrodes of the liquid crystal display unit 12 are the same or are electrically short-circuited to each other. It will be noted that although these electrodes are formed in a shape in accordance with the desired display density or display pattern, it is not necessary to provide matrix interconnections and the like.

It is necessary that the substrate 1 and the display-side substrate 35 respectively have sufficient transmittance in the wave-length region of an input signal light 37 and the visible region. Thus, it is especially desirable to use glass, plastic material and the like, which has high transparency, for the display-side substrate 35. In some cases, if desired, this substrate may be colored for appearance.

In the liquid crystal display device having such basic configuration, between the transparent electrode 34 and the lower electrode 2, a voltage which is necessary and sufficient for driving the liquid crystal is delivered by a power supply 36. This voltage must be larger than the threshold voltage of the optical switching device, and a liquid crystal material driven by a proper voltage is selected according to such requirement. In general, since the threshold voltage of the optical switching device is no more than 1.0 V, nearly all of the commercially available liquid crystal materials can be used without any problems.

Supposing that the above device is now in the dark. Since the optical switching device is then in high-resistance state, no electric field is applied to the liquid crystal layer 32. If the input signal light 37 is then projected on the optical switching unit 11 from the side of the substrate 1, only the irradiated region selectively becomes in low-resistance state. Hence, electric field is applied between the upper electrode 6 and the transparent electrode 34 corresponding to the irradiated region, so that the orientation of the liquid crystal can be controlled. Accordingly, the display density and resolution of the liquid crystal display device are determined by whichever is larger between (i) the one segment area of the upper electrode 6 and (ii) the area irradiated by input signal light 37.

Of course, FIG. 3 is a diagram showing only a basic configuration which may be properly modified according to the difference in the kind of the liquid crystal which is used and the like.

Figure 6:
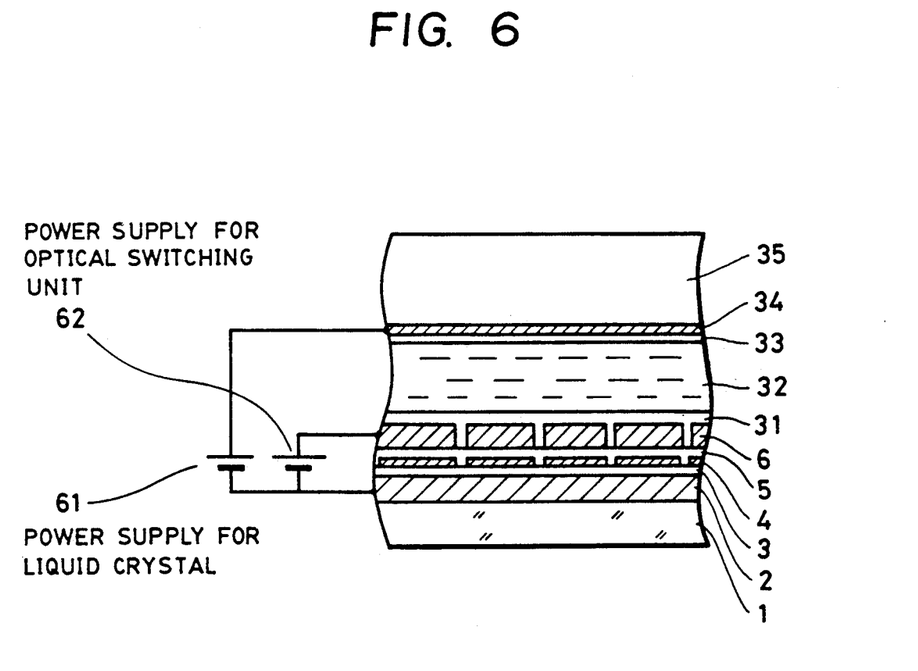
FIG. 6 is a configurational diagram showing an other aspect of a display device using a liquid crystal.

For example, in order to further ensure the operation of the optical switching unit, a biasing voltage no less than the threshold voltage of the optical switching unit may always be applied using a power supply (a power supply 62 for the optical switching unit) which is different from a power supply 61 for driving the liquid crystal, as shown in FIG. 6 (like numerals in FIG. 6 indicate like components as those in FIG. 3). In FIG. 6, the power supply for the optical switching unit is connected to only one segment at the left of the upper electrode 6 (of the optical switching unit). However, all segments of the upper electrode and the lower electrode 2 are actually connected to the optical switching unit power supply.

Additionally, for example, when the most commonly-used TN-mode display is utilized, it is necessary to provide a polarizer 38 as shown in FIG. 3. In most cases, it is also necessary to provide a reflective layer in the liquid crystal display unit 12. For this purpose, it is also possible to evaporate a suitable metal on or over the upper electrode 6 and the like.

Figure 4:
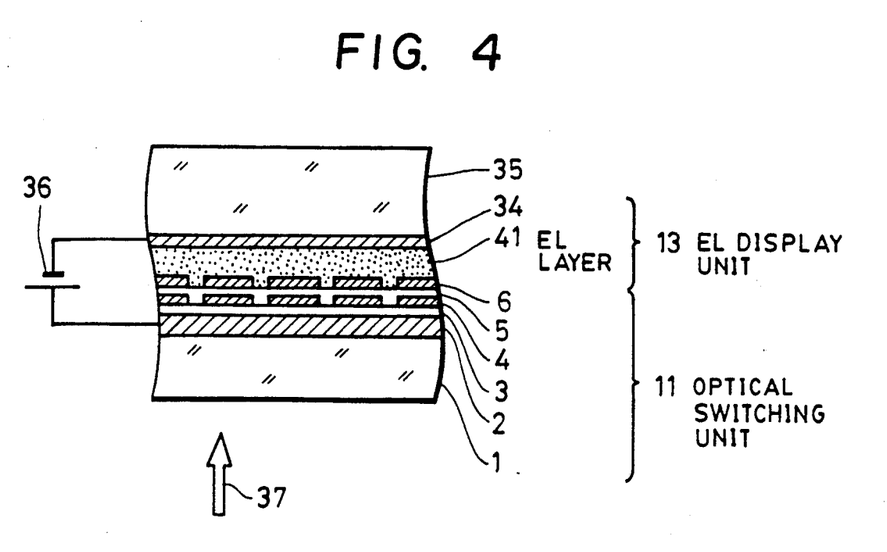
FIG. 4 is a configurational diagram of a display device using an EL.

On the other hand, when an EL material is used as the display medium, an EL layer 41 is held between the transparent electrode 34 and the upper electrode 6 as shown in FIG. 4. Other configurations are the same as embodiments where a liquid crystal is used.

However, almost all E1 materials now being developed require driving voltages as high as several tens to several hundreds of volts. Hence, it is difficult to practically utilize EL materials at present, although E1 material can be satisfactorily utilized if a material capable of being driven at low voltage were developed.

Figure 5:
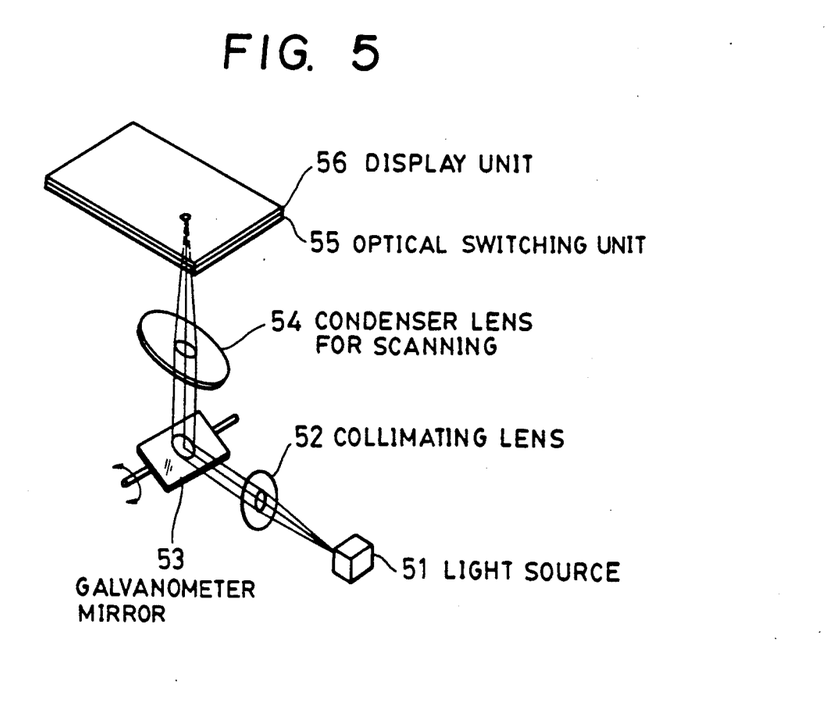
FIG. 5 is a configurational diagram of a light-beam scanning system.

In the display devices explained above, display is performed in accordance with the illumination - nonillumination of the input signal light. Hence, in order to perform a display having a certain area, it is necessary to scan the input signal light. As the scanning optical system for the light beam, those which are generally used can be satisfactorily utilized. The basic configuration of the system is shown in FIG. 5. In FIG. 5, as a light source 51, a semiconductor laser is usually used. The luminous flux from the semiconductor laser is made parallel by a collimating lens 52, which parallel beam is focused on an optical switching unit 55 by a condenser lens 54 for scanning via a galvanometer mirror 53, and a display unit 56 is driven. The light-beam scanning system shown here is but one example. It may, of course, have any other form with the condition of having the equivalent function, such as those in which plural scanning systems are used together, where a voice coil and a stepping motor is used together instead of the galvanometer mirror 53 and the like.

As the display medium used in the present invention, any material which has a display function when voltage is applied, such as liquid crystal, EL and the like, can be widely used. However, since the break-down voltage of the optical switching device used in the present invention is at most 20 V, and the maximum allowable current at low resistance state is 100 mA, display media are limited to those which operate within those ranges. Nevertheless, since the ratio of the current at low-resistance state to that at high-resistance state iON/iOFF is as large as $10^6$–$10^7$, it is possible to use, in the liquid crystal display media, the field-effect-type liquid crystal display method (the TN-mode display, DTN-mode display, SBE-mode display, GH-mode display, ECB-mode display, PC-mode display or the like) and the dynamic-scattering-type liquid crystal display method, and many of liquid crystal materials used in these methods.

The display media which can be utilized in the present invention are not to be limited to those described above. Any display media which operate at low voltage application (i.e., less than about 20 V) can be satisfactorily utilized.

EXAMPLE 1

An optical switching unit having the configuration of the lower electrode 2/the insulating thin film 3/the conductive thin film 4/the insulating thin film 5/the upper electrode 6 was formed by the procedure described hereinafter. The glass substrate 1 was subjected to hydrophobic processing in saturated hexamethyldisilazane (HMDS) vapor during an entire day and Cr (300 Å thick) was deposited as an underlayer by the vacuum deposition, Au (600 Å thick) was then deposited by the same method and the lower electrode 2 in the shape of a stripe 1 mm wide was formed. An accumulated film (about 40 Å thick) consisting of ten monomolecular layers of polyimide films was formed on such substrate by the LB method to provide the insulating thin film 3.

The method of forming an accumulated film consisting of monomolecular polyimide layers will be hereinafter described in detail.

Polyamide acid shown in Formula (1) was dissolved (monomer-reduced concentration: $1 \times 10^{-3}$M) in a mixed solvent of N,N-dimethylacetoamide-benzene (1:1 V/V), and then the resultant solution was further mixed with a separately-prepared $1 \times 10^{-3}$M solution of N,N-dimethyloctadecylamine in the above-described solvent in 1:2 (V/V) ratio to prepare a solutin of the octadecyl amine salt of polyamide acid shown in Formula (2).

Such solution was spread over pure water at a temperature of 20° C. and using the LB method, and accumulated film consisting of ten monomolecular layers of octadecylamine salt of polyimide acid was formed on the above-described substrate having the lower electrode. The surface pressure at this time was 25 mN/m, and the elevating and lowering speed of the substrate was 5 mm/min.

Such substrate was then fired at 400° C. for 30 minutes to convert the octadecylamine salt of polyimide acid in an imide (Formula (3)), and thus an accumulated film consisting of ten monomolecular layers of polyimide was obtained.

(3)

Al was then deposited in vacuum (20 Å thick) on the accumulated film in the shape of a stripe 1 mm wide so as to make a right angle with the lower electrode 2 in order to form the conductive thin film 4. At this time, the temperature of the substrate surface was maintained at no higher than room temperature. The film-forming rate was 3 Å/sec. The surface of such Al conductive thin film was then oxidized by restoring the pressure of the vacuum chamber to atmospheric pressure, to form the insulating thin film 5 of $Al_2O_3$. Subsequently, the vacuum chamber was again evacuated, and Al (300 Å thick) and Au (600 Å thick) were successively deposited in vacuum on the position having the same shape as the conductive thin film 4 to obtain the upper electrode 6.

On the optical switching unit 11 formed as described above, the liquid crystal display unit 12 was formed by the following procedure. That is, a polyimide resin was coated with a spinner (750 Å thick) on the substrate 1 which includes the optical switching unit 11, and then rubbing processing was performed to obtain the liquid crystal orientation layer 31. On the other hand, on a glass substrate which is the display-side substrate 35, an ITO film (2000 Å thick) was deposited to form the transparent electrode 34, a polyimide resin was coated by a spinner (750 Å thick) on such transparent electrode 34, and then rubbing processing was performed. A liquid crystal cell was constructed using the above-described switching unit 11 and the display-side substrate 35 with a liquid crystal (E-37, product of BDH Corp), and the thickness of which layer 32 was 10 μm.

A DC voltage of 2.5 V was applied between the transparent electrode 34 and the upper electrode 6 of the liquid crystal display device formed as described above, and the orientation state of the liquid crystal was observed from the side of the display-side substrate 35 using a polarizing microscope. As a result, it has been found that the liquid crystal has the twist orientation when there is no light illumination (white light ~70 μw/0.55 cm²) from the side of the substrate 1, and, by light illumination, the liquid crystal on the upper electrode 6 has the vertical orientation. Furhter, it has been confirmed that, when such light illumination is interrupted, the liquid crystal promptly returns to the twist orientation.

EXAMPLE 2

Cr 300 Å thick was deposited on the glass substrate 1 by the vacuum deposition as an underlayer, and Au (600 Å thick) was then deposited by the same method, and the lower electrode 2 having the shape of a stripe 1 mm wide was formed. On such substrate 1, an accumulated film consisting of ten monomolecular layers of polyimide was formed by the same method as in Example 1 to obtain the insulating thin film 3.

An amorphous silicon film 30 Å thick was then formed on the surface of this accumulated film consisting of monomolecular layers of polyimide to obtain the semiconductive thin film 4. In this case, the film was formed by the glow discharge method (introduced gases: $SiH_4$, $H_2$, rf power: 0.01 W/cm², pressure: 0.5 torr, substrate temperature: 250° C., deposition rate: 40 Å/min). Subsequently, a mixed gas consisting of silane ($SiH_4$) gas and ammonia gas was introduced, and a silicon nitride ($Si_3N_4$) film 15 Å thick was deposited (rf power: 0.02 W/cm², pressure: 0.5 torr, substrate temperature: 250° C., deposition rate: 50 Å/min), to form the insulating thin film 5.

On the surface of this silicon nitride film, Al (300 Å thick) and Au (600 Å thick) were then successively deposited in vacuum in the form of a stripe 1 mm wide so as to make a right angle with the lower electrode 2.

On the optical switching unit formed as described above, the same liquid crystal display unit as that in Example 1 was formed. The orientation of the liquid crystal for signal input light of such samples was investigated in the same manner as in Example 1, and it was confirmed that the samples show the same responsive property to light.

EXAMPLES 3 through 7

Samples were prepared totally in the same manner as in the above-described Example 1, except that the insulating thin films 3 were formed by the LB method using insulating materials shown in the following TABLE 1. The orientation of the liquid crystal for signal input light of these samples was investigated. The samples showed the same responsive property to light as in Example 1.

TABLE 1

| Example | Material for the insulating thin film 12 | Number of layers | Film-forming conditions | Thickness of the insulating thin film 12 (Å) |
|---|---|---|---|---|
| 3 | t-butyl-substituted lutetium diphthalocyanine | 8 | F = 25 mN/m | 180 |
| 4 | $C_{10}H_{21}C\equiv C-C\equiv C-(CH_2)_2COOH$ SOAZ; | 8 | F = 25 mN/m, polymerization by UV irradiation after forming the film | 140 |
| 5 |  | 8 | F = 20 mN/m | 120 |
| 6 |  copolymer of methacrylic acid and styrene | 10 | After film-forming (F = 25 mN/m) by adding N-hexadecyldimethylamine, remove the film by immersing in an n-hexane-acetic acid (50:1%) solution | 50 |
| 7 | polyisobutylmethacrylate | 10 | F = 10 mN/m | 110 |

EXAMPLE 8

A display device was formed in the same manner as in Example 1, except that the lower electrode was formed on the glass substrate 1 in the dimensions of 1×2 cm, and the conductive thin film 4, the insulating thin film 5 and the upper electrode 6 were formed in the 100 μm-square dot-matrix shape (120 μm pitch). A 2.5 V DC voltage was applied between the transparent electrode 34 and the upper electrode 6 of such samples, and the light corresponding to input signal was irradiated from the side of the optical switching unit (from the side of the substrate 1) using the laser-beam scanning system having the configuration shown in FIG. 5. It was confirmed that the state of the orientation of the liquid crystal in the liquid crystal unit on the dot-matrix-like electrode changes from the twist orientation to the vertical orientation only in irradiated portions. Further, it was also confirmed that the liquid crystal returns from such state of the vertical orientation to the twist orientation when light illumination is interrupted. As the light source, a GaAlAs laser array (beam diameter; 20 μm, 10 mW) was used.

EXAMPLE 9

Cr 300 Å thick was deposited on the glass substrate 1 by the vacuum deposition as an underlayer, and then Au (600 Å thick) was deposited by the same method, to form the lower electrode 2 having the shape of a stripe 1 mm wide. On such substrate, silicon nitride ($Si_3N_4$) film 40 Å thick was deposited by the glow discharge method (introduced gas: a mixed gas of $SiH_4$ and $NH_2$, rf power: 0.02 W/cm², pressure: 0.5 torr, substrate temperature: 300° C., deposition rate: 60 Å/min), to form the insulating region 3.

Al (20 Å thick) was then deposited on the surface of such silicon nitride film in vacuum in a 1 mm wide stripe which makes a right angle with the lower electrode to form the conductive region 4. Subsequently, the the pressure of the vacuum chamber was brought back to atmospheric in order to oxidize the surface of the Al conductive layer, to form the insulating region 5. The vacuum chamber was again evacuated, and Al (300 Å thick) and Au (600 Å thick) were successively deposited to form the upper electrode 6.

On the optical switching unit formed as described above, the same liquid crystal display unit as that in Example 1 was formed. The state of the orientation of the liquid crystal for signal input light of such samples was investigated in the same manner as in Example 1. The samples showed the same responsive property to light as that in Example 1.

EXAMPLE 10

After having formed the lower electrode 2 and the $Si_3N_4$ insulating region 3 in the same manner as in the above-described Example 9, an amorphous silicon film 40 Å thick was formed by the glow discharge method, to form the semi-conductive region 4 (introduced gas: $SiH_4$, $H_2$, rf power: 0.01 W/cm², pressure: 0.5 torr, substrate temperature: 300° C., deposition rate: 40 Å/min). Subsequently, the surface layer portion (about 10 Å) of such amorphous silicon was converted into silicon nitride ($Si_3N_4$) by the thermal nitriding method, to form the insulating region 5. Al (300 Å thick) and Au (600 Å thick) were then successively deposited in vacuum in the shape of a stripe 1 mm wide so as to make a right angle with the lower electrode 2, to form the upper electrode 6.

On the optical switching unit formed as described above, the same liquid crystal display unit as that in Example 1 was formed. The state of the orientation of the liquid crystal for signal input light of such samples was investigated in the same manner as in Example 1.

The samples showed the same responsive property to light as that in Example 1.

EXAMPLE 11

After having formed the Cr-Au lower electrode 2 and the $Si_3H_4$ insulating region 3 in the same manner as in the above-described Example 9, Ag (20 Å thick) was deposited in vacuum to form the conductive region 4. Subsequently, a silicon nitride ($Si_3N_4$) film 15 Å thick was deposited by the glow discharge method, to form the insulating region 5. Al (300 Å thick) and Au (600 Å thick) were then successively deposited in vacuum in the shape of a stripe 1 mm wide so as to make a right angle with the lower electrode 2, to obtain the upper electrode 6.

On the optical switching unit formed as described above, the same liquid crystal display unit as that in Example 1 was formed. The state of the orientation of the liquid crystal for signal input light of such samples was investigated in the same manner as in Example 1. The samples showed the same responsive property to light as that in Example 1.

EXAMPLE 12

Samples were prepared in the same manner as in the above-described Example 11, except that the conductive region made of Ag was replaced by the semiconductive region (40 Å thick) made of ZnS (the ion-cluster-beam method, acceleration voltage: 3 kV, substrate temperature: 150° C., deposition rate: 40 nm/min). The change in the state of the orientation of the liquid crystal for signal input light of such samples was investigated in the same manner as in Example 1. The samples showed the same responsive property to light as that in Example 1.

As explained above, according to the present invention, it is possible to input information signals by the optical addressing method, by means of combining an optical switching device obtained by alternately laminating insulating thin films and a conductive thin film, with a driving circuit of a display medium having responsive property to electric field, such as liquid crystal, EL or the like. Hence, it is not necessary to form a complicated interconnection pattern on a substrate, and production process can also be simplified. Moreover, since electric field can be directly applied to each of picture elements, it is possible to provide a high-density and high-quality display.

What is claimed is:

1. An optical addressing device comprising:
an optical switching unit means for addressing incident light, wherein said optical switching unit comprises a laminated structure provided between a pair of electrodes, said laminated structure comprising a conductive or semiconductive layer between a pair of insulating layers; and a light modulating medium responsive to the application of an electric field thereto.

2. An optical addressing device according to claim 1, wherein a liquid crystal display device is used as said light modulating medium.

3. An optical addressing device according to claim 1, wherein said conductive or semiconductive layer is at most 500 Å thick.

4. An optical addressing device according to claim 1, wherein said conductive or semiconductive layer is at most 50 Å thick.

5. An optical addressing device according to claim 1, wherein said insulating layer is from 4 to 500 Å thick.

6. An optical addressing device according to claim 1, wherein said insulating layer is at most 200 Å thick.

7. An optical addressing device comprising:
an optical switching unit means for addressing incident light, wherein said optical switching unit comprises a laminated structure provided between a pair of electrodes, said laminated structure comprising a conductive or semiconductive layer between a pair of insulating layers; and a light modulating medium responsive to the application of an electric field thereto, wherein said incident light is generated from a light source, a collimating lens, a galvanometer mirror and a condensor lens for scanning.

8. An optical addressing device according to claim 7, wherein a liquid crystal display device is used as said light modulating medium.

9. An optical addressing device according to claim 7, wherein said conductive or semiconductive layer is at most 500 Å thick.

10. An optical addressing device according to claim 7, wherein said conductive or semiconductive layer is at most 50 Å thick.

11. An optical addressing device according to claim 6, wherein said insulating layer is from 4 to 500 Å thick.

12. An optical addressing device according to claim 7, wherein said insulating layer is at most 200 Å thick.

13. A light modulating device comprising:
a signal input unit for generating an optical signal;
an optical switching unit comprising a laminated structure provided between a pair of electrodes, wherein said laminated structure comprises a conductive or semiconductive layer provided between a pair of insulating layers; and
a light modulating medium which is responsive to an electric field, wherein the electric field strength which is applied to said light modulating medium is controlled by irradiating or interrupting light incident on said optical switching unit in accordance with an input signal, whereby light modulation corresponding to the input signal can be performed.

14. A light modulating device according to claim 13, wherein a liquid crystal display device is used as said light modulating medium.

15. A light modulating device according to claim 13, wherein said conductive or semiconductive layer is at most 500 Å thick.

16. A light modulating device according to claim 15, wherein said conductive or semiconductive layer is at most 50 Å thick.

17. A light modulating device according to claim 13, wherein said insulating layers are from 4 to 500 Å thick.

18. A light modulating device according to claim 17, wherein said insulating layers are at most 200 Å thick.

19. A light modulating device according to claim 18, wherein said insulating layers are at most 100 Å thick.

20. A light modulating device according to claim 13, wherein said electrodes materials selected from the group consisting of Au, Ag, Al, Pt, Ni, Pb, Zn, Sn, and alloys of these metals, in thicknesses of at most 1,000 Å.

21. A light modulating device according to claim 20, wherein said electrodes are at most 500 Å thick.

22. A display device comprising:
a signal input unit for generating an optical signal;

an optical switching unit comprising a structure provided between a pair of electrodes, wherein said structure comprises a conductive or semiconductive layer provided between a pair of insulating layers; and a display medium which is responsive to an electric field, wherein the electric field strength which is applied to said display medium is controlled by irradiating or interrupting light incident on the optical switching unit in accordance with an input signal, whereby a display corresponding to the input signal can be displayed.

23. A display device according to claim 22, wherein a liquid crystal display device is used as said display medium.

24. A display device according to claim 22, wherein an electroluminescent display device is used as said display medium.

25. A display device according to claim 22, wherein said conductive or semiconductive layer is at most 500 Å thick.

26. A display device according to claim 22, wherein said conductive or semiconductive layer is at most 50 Å thick.

27. A display device according to claim 22, wherein said insulating layer is from 4 to 500 Å thick.

28. A display device according to claim 22, wherein said insulating layer is at most 200 Å thick.

29. A light modulating device comprising:

a signal input unit for generating an optical signal, comprising a semiconductor laser for generating the optical signal;

an optical switching unit comprising a structure provided between a pair of electrodes, wherein said structure comprises a conductive or semiconductive layer provided between a pair of insulating layers; and a light modulating medium which is responsive to an electric field, wherein the electric field strength which is applied to said light modulating medium is controlled by irradiating or interrupting light incident on said optical switching unit in accordance with an input signal, whereby light modulation corresponding to the input signal can be performed.

30. A light modulating device according to claim 29, wherein a liquid crystal display device is used as said light modulating medium.

31. A light modulating device according to claim 29, wherein said conductive or semiconductive layer is at most 500 Å thick.

32. A light modulating device according to claim 31, wherein said conductive or semiconductive layer is at most 50 Å thick.

33. A light modulating device according to claim 29, wherein said insulating layers are from 4 to 500 Å thick.

34. A light modulating device according to claim 33, wherein insulating layers are at most 200 Å thick.

35. A light modulating device according to claim 34, wherein said insulating layers are at most 100 Å thick.

36. A light modulating device according to claim 29, wherein said electrodes comprise materials selected from the group consisting of Au, Ag, Al, Pt, Ni, Pb, Zn, Sn, and alloys of these metals, in thickness of at most 1,000 Å.

37. A light modulating device according to claim 36, wherein said electrodes are at most 500 Å thick.

38. A light modulating device comprising:

a signal input unit for generating an optical signal, wherein said signal input unit comprises a light source, a colliminating lens, a galvanometer mirror and a condesor lens for scanning;

an optical switching unit comprising a laminated structure provided between a pair of electrodes, wherein said laminated structure comprises a conductive or semiconductive layer provided between a pair of insulating layers; and a light modulating medium which is responsive to an electric field, wherein the electric field strength which is applied to said light modulating medium is controlled by irradiating or interrupting light incident on said optical switching unit in accordance with an input signal, whereby light modulation corresponding to the input signal can be performed.

39. A light modulating device according to claim 38, wherein a liquid crystal display device is used as said light modulating medium.

40. A light modulating device according to claim 38, wherein said conductive or semiconductive layer is at most 500 Å thick.

41. A light modulating device according to claim 40, wherein said conductive or semiconductive layer is at most 50 Å thick.

42. A light modulating device according to claim 38, wherein said insulating layers are from 4 to 500 Å thick.

43. A light modulating device according to claim 42, wherein said insulating layers are at most 200 Å thick.

44. A light modulating device according to claim 43, wherein said insulating layers are at most 100 Å thick.

45. A light modulating device according to claim 38, wherein said electrodes comprise materials selected from the group consisting of Au, Ag, Al, Pt, Ni, Pb, Zn, Sn, and alloys of these metals, in thicknesses of at most 1,000 Å.

46. A light modulating device according to claim 45, wherein said electrodes are at most 500 Å thick.

47. A display device comprising:

a signal input unit for generating an optical signal, wherein said signal input unit comprises a light source, a collimating lens, a galvanometer mirror and a condensor lens for scanning;

an optical switchinng unit comprising a structure provided between a pair of electrodes, wherein said structure comprises a conductive or semiconductive layer provided between a pair of insulating layers; and a display medium which is responsive to an electric field, wherein the electrical field strength which is applied to said display medium is controlled by irradiating or interrupting light incident on said optical switching unit in accordance with an input signal, whereby a display corresponding to the input signal can be displayed.

48. A display device according to claim 47, wherein a liquid crystal display device is used as said display medium.

49. A display device according to claim 47, wherein an electroluminescent display device is used as said display medium.

50. A display device according to claim 47, wherein said conductive or semiconductive layer is at most 500 Å thick.

51. A display device according to claim 47, wherein said conductive or semiconductive layer is at most 50 Å thick.

52. A display device according to claim 47, wherein said insulating layer is from 4 to 500 Å thick.

53. A display device according to claim 47, wherein said insulating layer is at most 200 Å thick.

54. A display method comprising the steps of:
providing a display device comprising an optical switching unit comprising a structure provided between a pair of electrodes, wherein the structure comprises a conductive or semiconductive layer provided between a pair of insulating layers, and a display medium which is responsive to an electric field;
applying a bias voltage between the display medium and the optical switching unit;
irradiating the optical switching unit with light in accordance with an input signal to perform a displaying operation with the display medium.

55. A display method according to claim 54, wherein a liquid crystal display device is used as the display medium.

56. A display method according to claim 54, wherein an electroluminescent display device is used as the display medium.

57. A display method according to claim 54, wherein said irradiating step comprises the step of irradiating the optical switching unit with light from a semiconductor laser.

58. A light modulating method comprising the steps of:
providing a light modulating device comprising an optical switching unit comprising a structure provided between a pair of electrodes, wherein the structure comprises a conductive ot semiconductive layer provided between a pair of insulating layers, and a light modulating medium which is responsive to an electric field;
applying a bias voltage between the light modulating medium and the switching unit;
irradiating the light optical switching unit with light in accordance to an input signal to modulate light incident on the light modulating medium.

59. A light modulating method according to claim 58, wherein a liquid crystal display device is used as said light modulating medium.

60. An optical addressing method comprising the steps of:
providing a display device comprising an optical switching unit comprising a structure provided between a pair of electrodes, wherein the structure comprises a conductive or semiconductive layer provided between a pair of insulating layers, and a display meduim which is responsive to an electric field;
applying a bias voltage between the display medium and the switching unit; and
irradiating the optical switching unit with light in accordance to an input signal.

61. An optical addressing method according to claim 60, wherein a liquid crystal display device is used as the display medium.

62. An optical addressing method according to claim 60, wherein an electroluminescent display device is used as said display medium.

63. An optical addressing method comprising the steps of:
providing a light modulating device comprising an optical switching unit comprising a structure provided between a pair of electrodes, when the structure comprises a conductive or semiconductive layer provided between a pair of insulating layers, and a light modulating medium which is responsive to an electric field;
applying a bias voltage between the light modulating medium and the switching unit; and
irradiating the optical switching unit with light in accordance with an input signal.

64. An optical addressing method according to claim 63, wherein a liquid crystal display device is used as the light modulating medium.

* * * * *

UNITED STATES PATENT AND TRADEMARK OFFICE
CERTIFICATE OF CORRECTION

PATENT NO. : 5,020,881
DATED : June 4, 1991
INVENTOR(S) : HIROSHI MATSUDA, ET AL.

It is certified that error appears in the above-identified patent and that said Letters Patent is hereby corrected as shown below: Title page:

IN [56] REFERENCES CITED

U.S. PATENT DOCUMENTS, "Tamazaki et al." should read --Yamazaki et al.--.

SHEET 2 OF 5

FIG. 2(b), Insert --CURRENT-- along vertical axis.

COLUMN 2

Line 47, "an other" should read --another--.

COLUMN 4

Line 16, "ballance" should read --balance--.
    Line 19, "is" should be deleted.
    Line 20, "is" should read --are also--.

COLUMN 5

Line 49, "few" should read --little--.

COLUMN 7

Line 29, "E1" should read --EL--.
    Line 32, "E1" should read --EL--.

COLUMN 8

Line 36, "solutin" should read --solution--.
    Line 59, "and" (second occurrence) should read --an--.
    Line 68, "in" should read --to--.

UNITED STATES PATENT AND TRADEMARK OFFICE
CERTIFICATE OF CORRECTION

PATENT NO. : 5,020,881

DATED : June 4, 1991

INVENTOR(S) : HIROSHI MATSUDA, ET AL.

It is certified that error appears in the above-identified patent and that said Letters Patent is hereby corrected as shown below:

COLUMN 9

Line 67, "Furhter," should read --Further,--.

COLUMN 10

Line 59, "EXAMPLES 3 through 7" should read --EXAMPLES 3 THROUGH 7--.

COLUMN 11

TABLE 1, "  should read --  --.

COLUMN 12

Line 33, "the the" should read --the--.

COLUMN 14

Line 15, "condensor" should read --condenser--.
    Line 27, "6," should read --7,--.
    Line 62, "electrodes materials" should read --electrodes comprise materials--.

COLUMN 15

Line 58, "insulating layers" should read --said insulating layers--.

UNITED STATES PATENT AND TRADEMARK OFFICE
CERTIFICATE OF CORRECTION

PATENT NO. : 5,020,881
DATED : June 4, 1991
INVENTOR(S) : HIROSHI MATSUDA, ET AL.

Page 3 of 3

It is certified that error appears in the above-identified patent and that said Letters Patent is hereby corrected as shown below:

COLUMN 16

Line 3, "colliminating" should read --collimating--.
    Line 4, "condesor" should read --condenser--.
    Line 44, "condensor" should read --condenser--.

COLUMN 17

Line 15, "unit;" should read --unit; and--.
    Line 36, "ot" should read --or--.

COLUMN 18

Line 2, "accordance to" should read --accordance with--.
    Line 14, "meduim" should read --medium--.
    Line 19, "accordance to" should read --accordance with--.
    Line 30, "when" should read --wherein--.

Signed and Sealed this

Twelfth Day of January, 1993

Attest:

DOUGLAS B. COMER

Attesting Officer     Acting Commissioner of Patents and Trademarks